(12) United States Patent
Doany

(10) Patent No.: US 10,928,539 B2
(45) Date of Patent: Feb. 23, 2021

(54) MAGNETO-MECHANICAL MARKER WITH ENHANCED FREQUENCY STABILITY AND SIGNAL STRENGTH

(71) Applicant: 3M INNOVATIVE PROPERTIES COMPANY, St. Paul, MN (US)

(72) Inventor: Ziyad H. Doany, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 132 days.

(21) Appl. No.: 16/308,992

(22) PCT Filed: Jun. 9, 2017

(86) PCT No.: PCT/IB2017/053432
§ 371 (c)(1),
(2) Date: Dec. 11, 2018

(87) PCT Pub. No.: WO2017/221099
PCT Pub. Date: Dec. 28, 2017

(65) Prior Publication Data
US 2019/0250299 A1    Aug. 15, 2019

Related U.S. Application Data

(60) Provisional application No. 62/353,889, filed on Jun. 23, 2016.

(51) Int. Cl.
*G01V 3/165* (2006.01)
*G01V 3/08* (2006.01)

(52) U.S. Cl.
CPC .............. *G01V 3/165* (2013.01); *G01V 3/081* (2013.01)

(58) Field of Classification Search
CPC .......... H03H 9/24; H01F 1/153; G08B 13/24; G08B 13/2408; G01V 3/08; G01V 3/081; G01V 3/165
See application file for complete search history.

(56) References Cited

U.S. PATENT DOCUMENTS 2,856,588 A    10/1958  Burns, Jr.
3,256,738 A *  6/1966  Di Giacomo ....... G01F 23/2967
                                                  73/290 R
(Continued)

FOREIGN PATENT DOCUMENTS

GB          822536       12/1956
WO    WO 2014-120502     8/2014

OTHER PUBLICATIONS

Bernhard, "Removal of Earth's magnetic field effect on magnetoelastic resonance sensors by an antisymmetric bias field," Sensors and Actuators A, Physical, Aug. 2012, vol. 183, No. 44-2, pp. 11-15.

(Continued)

*Primary Examiner* — Son T Le
(74) *Attorney, Agent, or Firm* — Gregg H. Rosenblatt

(57) ABSTRACT

A magneto mechanical resonator device comprises a ferromagnetic resonator element having a length substantially equal to an integer multiple (N) of a ½ wavelength of a resonant frequency of the ferromagnetic resonator element, wherein the ferromagnetic resonator element is formed from an amorphous metal material, wherein N is at least 2, and at least one bias magnetic element disposed along a lateral side of the ferromagnetic resonator element.

18 Claims, 7 Drawing Sheets

(56) References Cited

U.S. PATENT DOCUMENTS

| | | | |
|---|---|---|---|
| 5,841,348 A | 11/1998 | Herzer | |
| 6,011,475 A | 1/2000 | Herzer | |
| 6,018,296 A | 1/2000 | Herzer | |
| 6,254,695 B1 | 7/2001 | Herzer | |
| 6,299,702 B1 | 10/2001 | Herzer | |
| 6,359,563 B1 | 3/2002 | Herzer | |
| 6,426,700 B1* | 7/2002 | Lian | G08B 13/2408 340/572.4 |
| 6,551,416 B1 | 4/2003 | Herzer | |
| 2005/0242955 A1* | 11/2005 | Lian | G08B 13/244 340/572.6 |
| 2012/0068823 A1 | 3/2012 | Doany | |
| 2012/0325359 A1 | 12/2012 | Doany | |
| 2013/0099790 A1 | 4/2013 | Doany | |
| 2016/0030756 A1 | 2/2016 | Dronov | |

OTHER PUBLICATIONS

International Search Report for PCT International Application No. PCT/IB2017/053432, dated Sep. 21, 2017, 4 pages.

\* cited by examiner

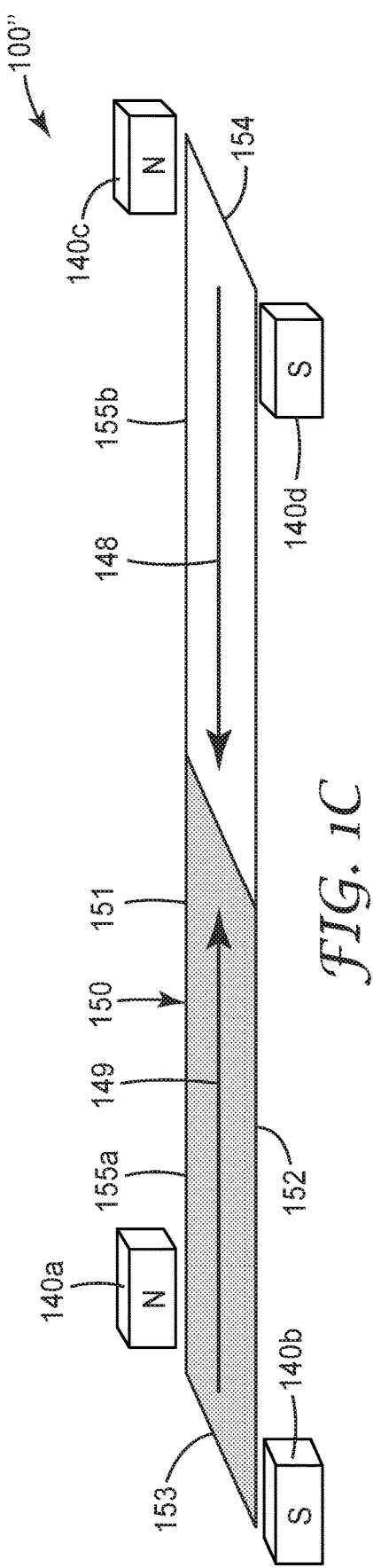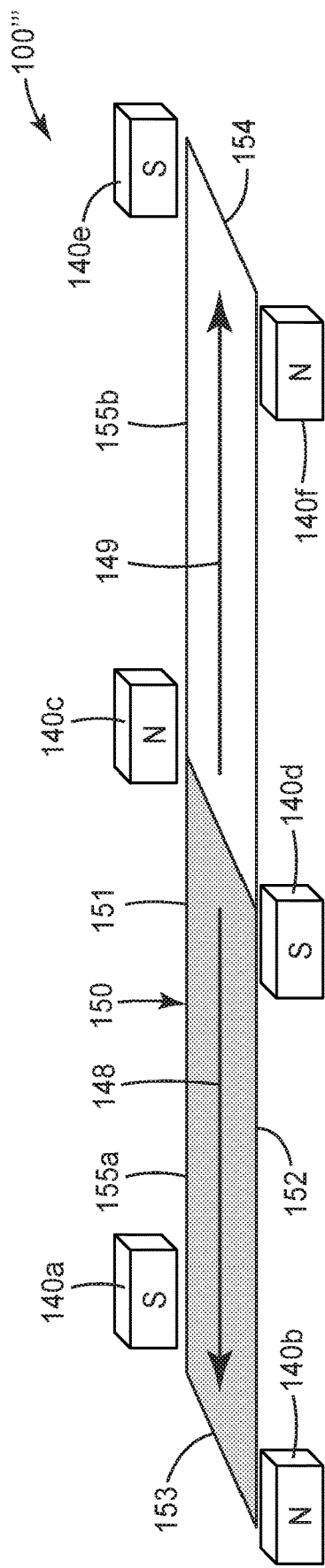

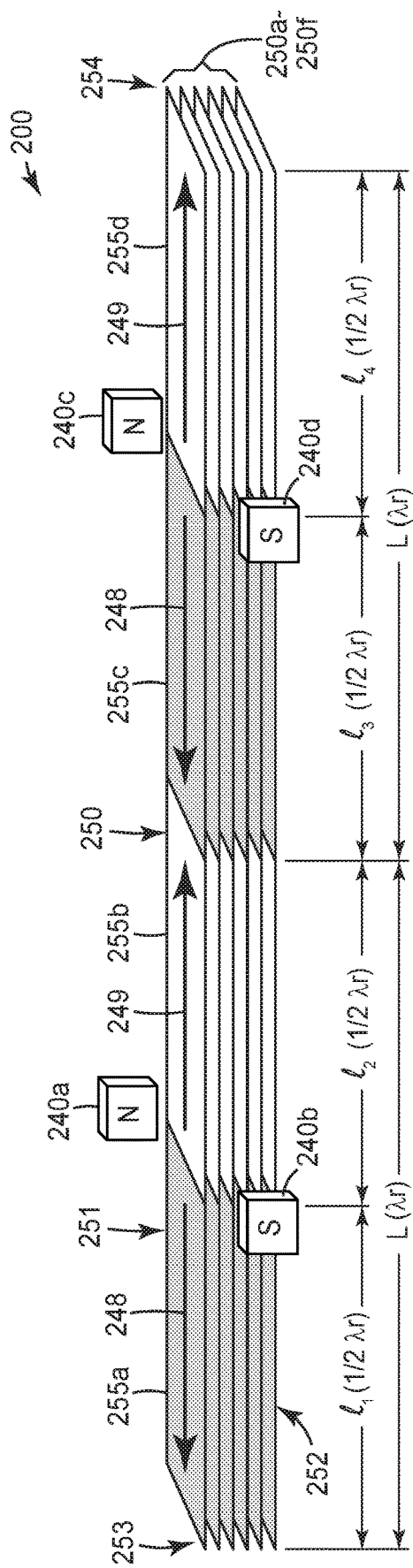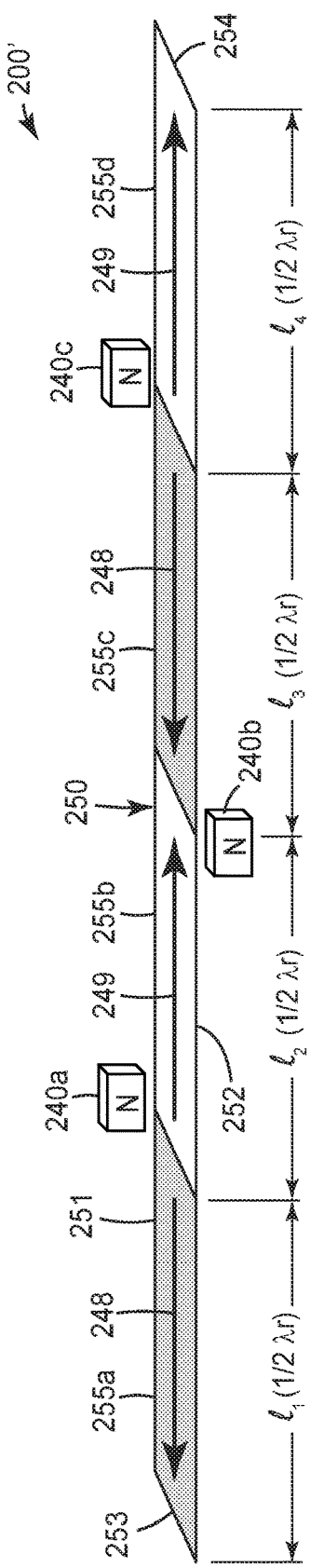
FIG. 2A
FIG. 2B

MAGNETO-MECHANICAL MARKER WITH ENHANCED FREQUENCY STABILITY AND SIGNAL STRENGTH

BACKGROUND

Magneto mechanical resonators are well known and have been used in retail security applications for decades. In addition, magneto-mechanical resonators (MMRs) are also suitable for buried infrastructure due to their low cost, low profile and flexible components. They can be configured as stand-alone markers or physically attached to an underground pipe or utility. They can be used to identify a buried asset and its location accurately. For example, see US 2012/068823; US 2012/0325359; US 2013/0099790; and US 2016/030756; each of which is incorporated herein by reference in its entirety.

However, the detection range and frequency stability of such MMRs can be limited. For example, performance can be limited by the length of the metal ribbon used in the marker and the frequency stability of the marker can be influenced by the earth's magnetic field.

SUMMARY OF THE INVENTION

In a first aspect of the invention, a magneto mechanical resonator (MMR) device comprises a ferromagnetic resonator element having a length substantially equal to an integer multiple (N) of a ½ wavelength of a resonant frequency of the ferromagnetic resonator element, the ferromagnetic resonator element formed from an amorphous metal material, and wherein N is at least 2. The MMR device also includes at least one bias magnetic element disposed along a lateral side of the ferromagnetic resonator element.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The invention will be described hereinafter in part by reference to non-limiting examples thereof and with reference to the drawings, in which:

FIG. 1C is an isometric view of components of a magneto mechanical marker according to another aspect of the invention.

FIG. 1D is an isometric view of components of a magneto mechanical marker according to another aspect of the invention.

FIG. 2A is an isometric view of components of a magneto mechanical marker according to another aspect of the invention.

FIG. 2B is an isometric view of components of a magneto mechanical marker according to another aspect of the invention.

Figure 1A:
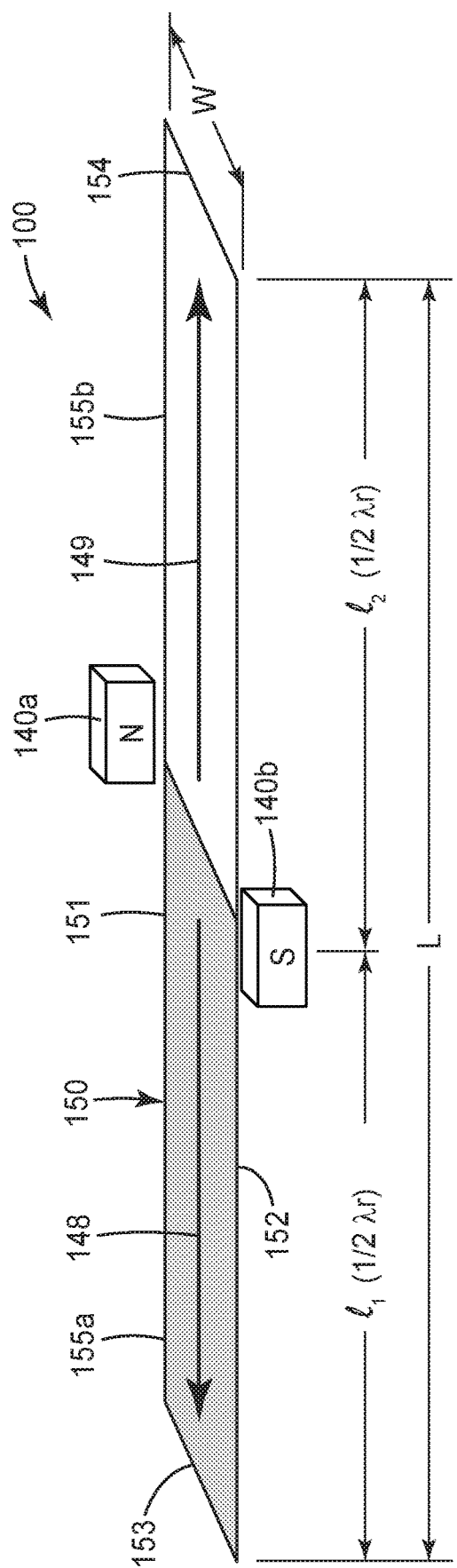
FIG. 1A is an isometric view of components of a magneto mechanical marker according to a first aspect of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF EMBODIMENTS

In the following description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

A magneto mechanical resonator (MMR) marker with extended signal range for use in locating and identifying buried assets is described herein. In particular, the MMRs described herein utilize a differential alternating biasing structure of an amorphous metal ribbon having a length that is an integer multiple (N, where the integer N is at least 2) of a half wavelength of a corresponding resonant frequency. Such a magneto mechanical resonator can be suitable for buried infrastructure due to its low cost, low profile and flexible components. The MMR marker can be a stand-alone marker, it can be physically attached to an underground asset, such as a coiled or stick pipe or other utility, or it can be attached to another device or carrier, such as caution or warning tape, located at or near the underground asset. In particular, the MMR markers described herein can provide frequency tunability, high frequency stability, high energy storage, and a low profile, all in combination with extended detection range over conventional MMR markers.

FIG. 1A shows a first aspect of the present invention, a portion of an MMR marker 100. MMR marker 100 includes one or more ferromagnetic elements 150 (also referred to herein as resonator strips or ribbons). In this embodiment, the ferromagnetic element comprises a single resonator strip 150. Alternatively, an MMR marker can include a plurality of resonator elements disposed in a stacked arrangement, such as shown in FIG. 2A, described in further detail below.

In one aspect, ferromagnetic element 150 has a substantially rectangular, strip form, with opposing lateral sides 151 and 152, a first lengthwise end 153 and a second lengthwise end 154. In alternative embodiments, the ferromagnetic element can have another shape, such as a substantially oval shape.

In this aspect of the invention, resonator strip(s) 150 comprise a ferromagnetic material with magnetostrictive properties, such as a magnetic amorphous alloy or crystalline material such as those available from Vacuumschmelze GmbH of Hanau, Germany or Metglas, Inc. of Conway, S.C. The physical dimensions, such as the length (L), width (W), and thickness, of the resonator strip(s) can be chosen based on a number of factors, including the desired response frequency. The ribbons may be annealed or non-annealed. The ribbons may be flat or they may have some degree of curl. Commercial alloys and annealing techniques are known and are described in, for example, U.S. Pat. Nos. 5,841,348; 6,018,296; 6,011,475; 6,299,702; 6,551,416; US 2010/358950; U.S. Pat. Nos. 6,254,695; 6,359,563; and US 2009/677245.

In one aspect of the invention, the resonator strip 150 has a length that is an integer multiple of a half wavelength of a corresponding resonant frequency. In another aspect, the integer (N) is at least two (e.g., N=2, 3, 4, . . . ). As explained further below, in another preferred aspect, N equals an even number of 2 or more (e.g., N=2, 4, 6, . . . ). When using an even number of ½ wavelength segments, there will be a higher stability of the resonant frequency under an ambient magnetic field such as the earth's magnetic field.

The fundamental resonant frequency (Fr) of the longitudinal mechanical vibration of a long rectangular-shaped ribbon of amorphous metal, having a substantially longitudinal magnetic field bias H can be defined as follows:

$$Fr=[1/(2L)]*sqrt(EH/\varphi;$$

where L is the sample length, EH is Young's modulus at the bias field H and p is the mass density.

Since Fr is inversely proportional to $\lambda r$, then $(1/\lambda r)$ is proportional to $[1/(2L)]$ which results in the length of the resonating ribbon L being proportional to ½ $\lambda r$ or a half-wavelength of the resonating ribbon. As shown in FIG. 1A, resonator strip 150 has an overall length L, which corresponds to the sum of the half-wavelength segments (here segments 155a and 155b), with segment 155a having a length $l_1$ and segment 155b having a length $l_2$.

In contrast to conventional MMR marker configurations, which typically provide bias magnets that are disposed underneath or above a resonator strip or strips, MMR marker 100 includes one or more bias magnetic elements disposed at a side edge 151 or opposite side edge 152 of the ferromagnetic element 150.

In this aspect of the invention, it is advantageous to bias the resonator strip to an H field that produces the highest level for magneto-mechanical energy transfer and storage. Therefore, for increasing the detection range to a MMR operating at a desired frequency Fr, it is advantageous to affect the biasing of the resonator strip in a manner which would allow for a long ribbon N*L length, substantially an integer multiple N (where N=2, 3, 4, 5, . . . ) of the fundamental ½ $\lambda r$ wavelength, to vibrate at the desired shorter wavelength. In this aspect, this effect can be achieved by alternating the direction of the bias field H along the length of the ribbon at substantially every ½ $\lambda r$ wavelength.

The magnetic field coupling between a detector's antenna and the resonator ribbons greatly increases for longer ribbons, up to the square of the length increase of a ribbon for small geometries. Furthermore, in this aspect of the invention, since all the ½ $\lambda r$ sections are actually connected and make a single long ribbon, a single frequency resonator is achieved which simlifies the detection algorithms.

In this aspect, as is shown in FIG. 1A, a first bias magnetic element 140a is disposed along side edge 151 at a position equidistant from first and second end portions 153, 154. In addition, a second bias magnetic element 140b is disposed along side edge 152 at an opposite position, also equidistant from first and second end portions 153, 154. In this configuration, both bias magnetic elements have their respective north (N) poles facing each other. As such the H field lines from the magnetic elements align in the directions of arrows 148, 149 as shown in FIG. 1A, where segment 155a is biased in a direction 148 opposite to the direction 149 that segment 155b is biased. In this manner, each ½ $\lambda r$ segment is biased in an opposite longitudinal direction. When all the alternating sections are biased substantially equally and are substantially equal in length, all sections will have matching frequencies, and thus maximum coherence and energy storage can be achieved.

In this example, a ribbon of a length L equivalent to two ½ $\lambda r$ segments, having opposite longitudinal biases, would exhibit two vibrating segments at ½ $\lambda r$ each, but are out of phase mechanically when subjected to an external alternating magnetic field from a detector. This is due to the bias direction reversal insensitivity of the magnetostriction effect, whereby magnetic materials always stretch when subjected to a positive or negative field along a specific direction. Therefore, the ribbon is stretched equally in all segments by the bias field even though the bias is changing direction.

When an external AC excitation field is applied, the bias field in each ½ $\lambda r$ segment is affected by either increasing or decreasing, depending on whether the external field direction is in phase or out of phase with respect to the bias field. Since the ribbon segments are already stretched by their respective bias fields, they will exhibit either an increase or a decrease in the amount of stretch when subjected to an external field that is in-phase or out-of-phase of the bias field direction, respectively. Therefore, the two oppositely biased adjacent segments will vibrate mechanically out-of-phase, where one will stretch more while the other will stretch less, substantially by an equal amount, allowing and enhancing the ½ $\lambda r$ vibration mode by substantially eliminating the loading of adjacent ½ $\lambda r$ ribbons.

From the above, it is shown that the resonant mode of a ribbon of length L having two (½ $\lambda r$) segments with alternating bias directions remains ½ $\lambda r$. The same analysis can be extended to N being greater than two, provided that the bias direction is reversed every ½ $\lambda r$.

Moreover, the exemplary resonator configuration of FIG. 1A has a single dominant resonance mode that is a function of the bias magnitude, bias reversal distance and total length of the ribbon.

In situations where the segments are not matched, energy storage still occurs but at substantially the average frequency of the resonating sections, with a magnitude reduction dependent on the amount of mismatch.

With this configuration, when exposed to an external magnetic field at a particular frequency, the resonator strip(s) couple(s) to the external magnetic field and convert(s) the magnetic energy into mechanical energy, in the form of magneto-mechanical oscillations of the resonator strip(s). In operation, MMR marker 100 resonates at its characteristic frequency (Fr) when interrogated (using e.g., a portable locator) with an alternating magnetic field tuned to this frequency. Energy is stored in the marker during this interrogation period in the form of both magnetic and mechanical energy (manifested as resonator vibrations). When the interrogation field is removed, the resonator continues to vibrate at its resonant frequency as it dissipates the stored energy, generating its own AC magnetic field that can be remotely sensed with a suitable detector, which can be incorporated within the same portable locator. Thus, MMR marker 100 can be located by exciting it with an external alternating magnetic field where energy is stored in the marker, and then detecting the magnetic field generated by the MMR marker as it dissipates its stored energy exponentially, at its own resonant frequency. Such a response alerts a locating technician to the presence of MMR marker 100.

The MMR antenna length (or aperture) and gain (or resonance quality) directly affects the maximum detection range, along with the locator transmitting power and receiver. The higher the received signal, the higher the detection range would be, as expected. However, as observed by the investigators, conventional MMR performance is highly sensitive to environmental conditions.

In one example, a 40 mm long ribbon corresponds to approximately 55 kHz fundamental frequency mechanical resonator. In another example, an 80 mm long ribbon can be made to resonate at 55 kHz (instead of 27.5 kHz) by reversing the longitudinal bias at every 40 mm segment, such as is shown in FIG. 1A.

Alternately, in another example, a 160 mm long ribbon can be made to resonate at 55 kHz (instead of 13.75 kHz) by reversing the longitudinal bias every 40 mm along the length of the ribbon. Such an example longer ribbon is shown in FIGS. 2A and 2B, described further below. Of course, other resonator strip lengths can be utilized, depending on the intended resonant frequency.

In operation, when a locator device having an alternating signal H field is coupled to the ferromagnetic element 150, it will add algebraically to the bias field thus increasing the bias on a ½ λr segment (e.g., segment 155a) of the resonator strip while decreasing the bias on the adjacent ½ λr segment (e.g., segment 155b) of the resonator strip. Due to the magnetostriction effect, the segments with increased bias will stretch along the field and the segments with decreased bias will shrink, with respect to the normal stretch caused by the bias. This differential biasing configuration can thus make a very long ribbon perform like a cluster of individually vibrating shorter wavelength sections with the alternating mechanical vibration phase determined by the distance that the bias field is reversed.

As mentioned above, lateral placement of the bias magnet elements along the length of the resonator strip is an important factor in the MMR device operation. In addition, another important factor to consider is the distance each bias magnetic element is placed from the side edge of the resonator strip. As will be discussed further below, proper spacing of the bias magnetic element(s) can help provide a flattened frequency response. Moreover, this side edge differential bias magnetic element orientation can help reduce the effects of gravity on the ferromagnetic element or stack of elements when contrasted with a single bottom or top biasing configuration, where ribbons can move significantly closer to the bias magnet, making clamping possible when the bias and gravity are in line. Furthermore, ribbons in a stack tend to repel each other due to same magnetic polarity and require more up/down air space for movement than sideways space. Hence it is advantageous to have side edge biasing and side movement constraints for ribbons. When using an even number of ½ wavelength segments, there will be a higher stability of the resonant frequency under an ambient magnetic field such as the earth's magnetic field. When N (the total number of ½ λr segments) is an even number, then the average frequency remains substantially the same when biased in the linear region (H vs F).

For the embodiment shown in FIG. 1A, bias magnet elements 140a, 140b can be spaced at a distance of about 0.5 mm-10 mm, preferably about 4 mm-6 mm, from respective side edges 151, 152 of the ribbon(s).

Bias magnetic elements 140a, 140b can each comprise a permanent magnet or a magnetically hard or semi-hard metal strip. A magnetically hard magnetic bias material that is not readily changeable can be utilized herein because its bias characteristics are unlikely to change when buried underground. The magnetic bias element can be made from any magnetic material that has sufficient magnetic remanence when magnetized to appropriately bias the resonators, and sufficient magnetic coercivity so as to not be magnetically altered in normal operating environments. A commercially available magnetic material suitable for biasing is a neodymium iron boron magnet (NdFeB). For example, in one particular aspect, the dimensions of the bias magnets (neodymium magnets available from K&J Magnetics Inc.) can be about 1/16" (thickness), 1/8" (height), and ¼ (width) with magnetization through the thickness. Of course, bias magnet dimensions can vary based on resonator element size and width. As with linear or bar magnets, bias magnetic elements 140a, 140b can each have magnetic poles, one at each end, as indicated by the N (North) and S (South) designations shown in FIG. 1A. In any of the configurations described herein, it can be shown that all bias magnets can be reversed, by substituting N for S and S for N, without affecting the resonant frequency or gain of the MMR resonator.

In use, the resonator strip 150 and bias magnetic elements 140a, 140b may be disposed in a rugged housing, as will be described in further detail below.

Thus, the differentially biased resonator configuration described in FIG. 1A allows for the usage of longer single ribbon resonators, having a single frequency resonance (as opposed to multiple separate resonator frequencies). In addition, the magnetic field coupling to the locator device can be increased by up to $N^2$, where N is the number of ½ λr segments. Frequency shift due to an external magnetic field along the axis (e.g., from the earth's magnetic field) can be reduced. When an even number of ½ λr segments are used, a cancellation of the increased/decreased propagation velocity in each ½ λr segment occurs due to the opposite biasing scheme, maintaining the relationship L=N*½ λr, and thus maintaining the same resonant frequency. The cancellation depends on the linearity of the ribbon material (F vs H) around the bias field level.

In an alternative aspect, in order to increase the detection range it is advantageous to use longer ribbons. In a further alternative, clusters of shorter ribbons may need to be utilized for practicality reasons (such as the buried asset shape, etc.). When multiple MMR markers are used to amplify the response, higher gain is achieved by highly stable markers as well as MMR configurations that vary in a predictable manner where all the MMRs in a cluster would shift substantially the same amount and continue to add as a function of the number of markers in a cluster, instead of, in a worse case, subtracting from each other due to phase reversal.

There are several specific performance related characteristics, such as frequency, signal and Q that can be optimized with an MMR marker locator system, with each having its own advantages depending upon the specific application and detection criteria. In many applications, the orientation and rotation of an MMR marker cannot be controlled. The earth's magnetic field adds to the ribbon bias field as a vector, increasing or reducing it by up to +/−0.6 Oe. This causes less frequency shift when a higher order resonator stack is used. As observed, the earth's gravitational pull of the suspended ribbon has a higher effect on long ribbons, which are necessary for some frequency ranges. Therefore, it is advantageous to construct and configure the MMR marker as described herein to obtain a consistent performance in all orientations.

Figure 1B:
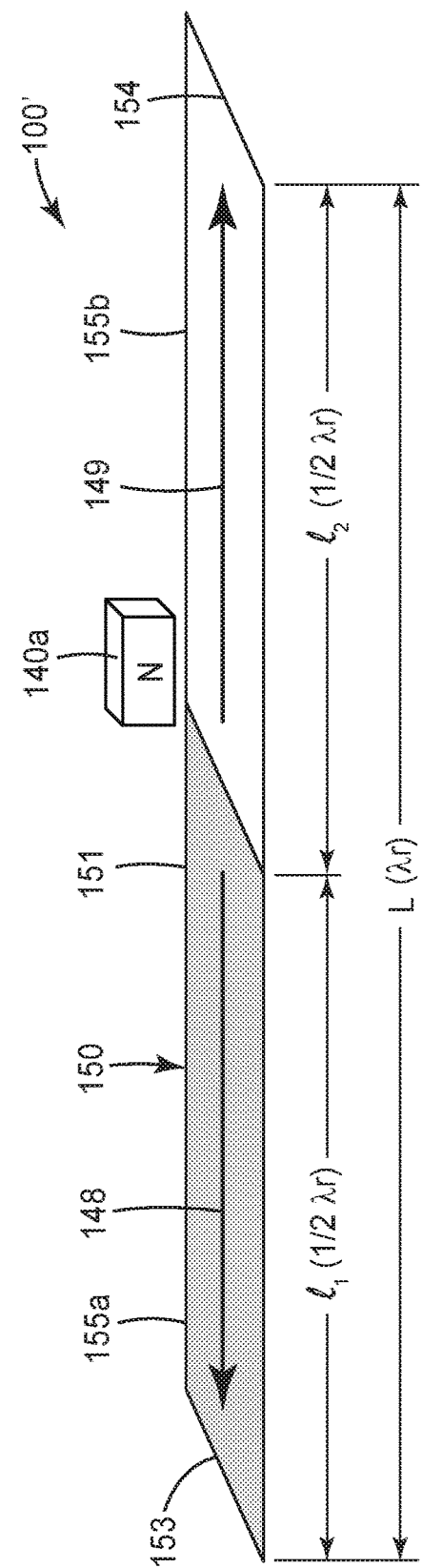
FIG. 1B is an isometric view of components of a magneto mechanical marker according to another aspect of the invention.

FIG. 1B shows another aspect of the present invention, an MMR marker 100'. MMR marker 100' includes one or more ferromagnetic elements 150, in this embodiment, only a single resonator strip is shown. In one aspect, ferromagnetic element 150 has a substantially rectangular, strip form, with opposing lateral sides 151 and 152, a first lengthwise end 153 and a second lengthwise end 154. In alternative embodiments, the ferromagnetic element can have another shape, such as a substantially oval shape.

In this alternative aspect, as is shown in FIG. 1B, a single bias magnetic element 140a is disposed along side edge 151 at a position equidistant from first and second end portions 153, 154. Additional bias magnetic elements are not necessary. In this configuration, the bias magnetic element has its north (N) pole facing the resonator strip 150. As such, the H field lines from the magnetic element align in the directions of arrows 148, 149 as shown in FIG. 1B, where segment 155a is biased in a direction 148 opposite to the direction 149 that segment 155b is biased. In this manner, each ½ λr segment is biased in an opposite longitudinal direction. When all the sections are biased equally and are equal in length, matching frequencies of all the vibrating sections, and thus maximum coherence and energy storage, can be achieved.

Other aspects of MMR marker 100' can be the same as those described with respect to FIG. 1A.

FIG. 1C shows yet another aspect of the present invention, an MMR marker 100". MMR marker 100" includes a one or more ferromagnetic elements 150, in this embodiment, only a single resonator strip is shown. In one aspect, ferromagnetic element 150 has a substantially rectangular, strip form, with opposing lateral sides 151 and 152, a first lengthwise end 153 and a second lengthwise end 154. In alternative embodiments, the ferromagnetic element can have another shape, such as a substantially oval shape.

In this alternative aspect, as is shown in FIG. 1C, a plurality of bias magnetic elements are disposed at side edge positions co-located with the first and second end sections of the ferromagnetic element 150. For example, first and second bias magnetic elements 140a, 140b are disposed opposite one another along side edges 151 and 152 at the first end portion 153. In addition, third and fourth bias magnetic elements 140c, 140d are disposed opposite one another along side edges 151 and 152 at the second end portion 154. The bias magnetic elements 140a-140d all have their north (N) poles facing the resonator strip 150. As such, the H field lines from the magnetic elements align in the directions of arrows 149, 148 as shown in FIG. 1C, where segment 155a is biased in a direction 149 opposite to the direction 148 that segment 155b is biased. In this manner, each ½ λr segment is biased in an opposite longitudinal direction. When all the sections are biased equally and are equal in length, matching frequencies of all the vibrating sections, and thus maximum coherence and energy storage, can be achieved.

Other aspects of MMR marker 100" can be the same as those described with respect to FIG. 1A.

FIG. 1D shows yet another aspect of the present invention, an MMR marker 100. MMR marker 100" includes a one or more ferromagnetic elements 150, in this embodiment, only a single resonator strip is shown. In one aspect, ferromagnetic element 150 has a substantially rectangular, strip form, with opposing lateral sides 151 and 152, a first lengthwise end 153 and a second lengthwise end 154. In alternative embodiments, the ferromagnetic element can have another shape, such as a substantially oval shape.

In this alternative aspect, as is shown in FIG. 1D, a plurality of bias magnetic elements are disposed at side edge positions, with some being co-located with the first and second end sections of the ferromagnetic element 150, and with others being equidistant from the first and second end sections of the ferromagnetic element 150. For example, first and second bias magnetic elements 140a, 140b are disposed opposite one another along side edges 151 and 152 at the first end portion 153. In addition, third and fourth bias magnetic elements 140c, 140d are disposed opposite one another along side edges 151 and 152 at a central longitudinal position along the length of the resonator strip 150, with each bias magnetic element 140c, 140d being located equidistant from first and second end portions 153, 154. Further, fifth and sixth bias magnetic elements 140e, 140f are disposed opposite one another along side edges 151 and 152 at the second end portion 154.

The bias magnetic elements 140a, 140b and 140e, 140f have their south (S) poles facing the resonator strip 150, and the bias magnetic elements 140c, 140d have their north (N) poles facing the resonator strip 150. As such, the H field lines from the magnetic elements align in the directions of arrows 148, 149 as shown in FIG. 1D, where segment 155a is biased in a direction 148 opposite to the direction 149 that segment 155b is biased. In this manner, each ½ λr segment is biased in an opposite longitudinal direction. When all the sections are biased equally and are equal in length, matching frequencies of all the vibrating sections, and thus maximum coherence and energy storage, can be achieved.

Other aspects of MMR marker 100''' can be the same as those described with respect to FIG. 1A.

Figure 4:
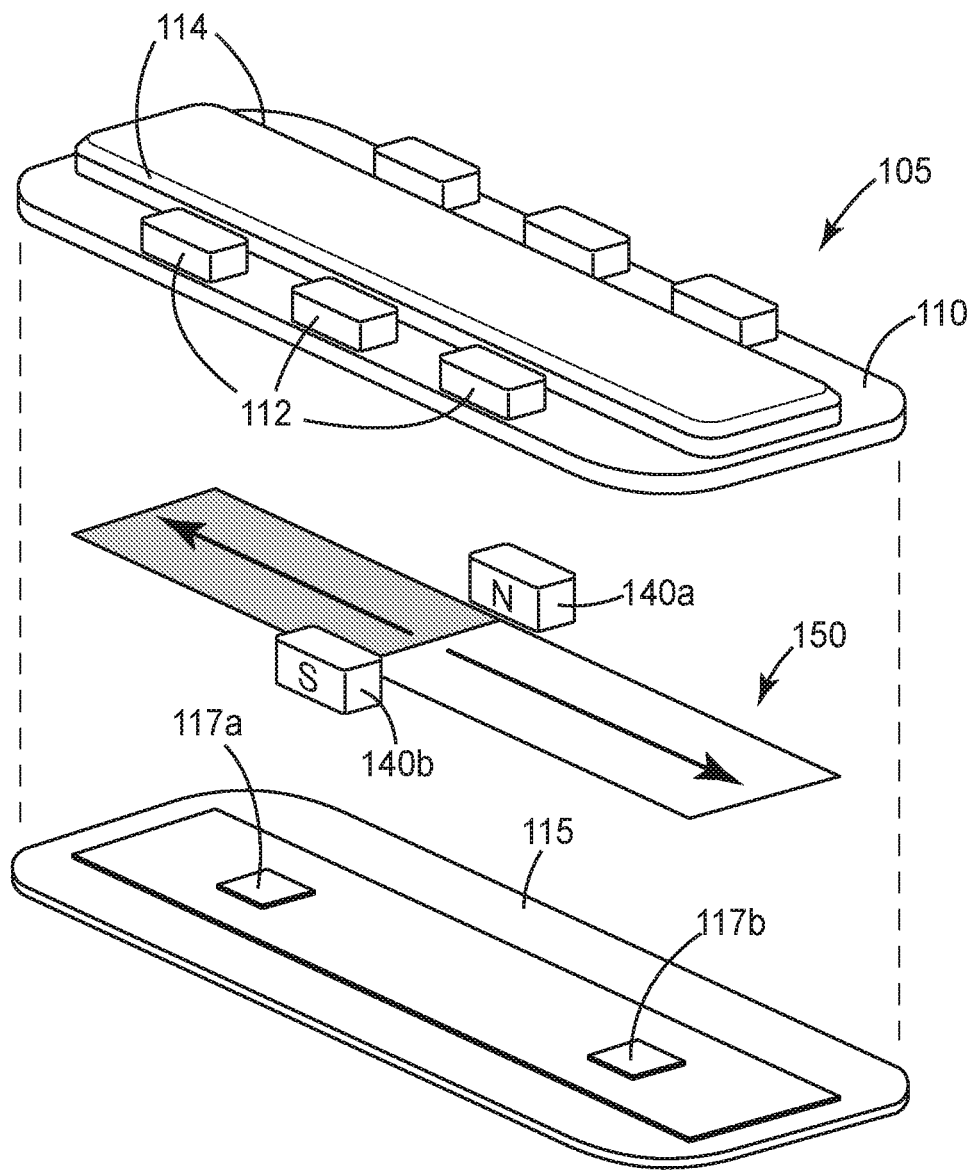
FIG. 4 is an exploded isometric view of a housing and components of a magneto mechanical marker according to another aspect of the invention.

As shown in the exploded view of FIG. 4, MMR marker 100 (or MMR marker 100') can further include a housing 105. The housing 105 can include a substrate 115 and a cover 110. The housing 105 is preferably rugged and is designed to mount and secure the resonator configurations described herein.

As shown in FIG. 4, MMR marker 100 can include a substrate 115 to support the resonator strip(s) 150 of the MMR marker and the one or more bias magnetic elements and a cover 110 to enclose the MMR marker components. In this aspect, at least one of the substrate and cover can include side restraint features (such as side wall 114) located along each side of the resonator strip(s) to constrain side movement of the resonator strip(s).

Moreover, in this aspect, at least one of the substrate and cover can include one or more slots located along each side of the resonator strip(s) and are positioned at end and/or central locations along the length of the resonator strip(s) (as shown in FIG. 4, the cover 110 includes six such slots 112). In one aspect, the one or more bias magnetic elements can be secured within the one or more slots (e.g., by use of friction fit or adhesive). The housing 105 can thus be configured to maintain the proper distance of the bias magnet element(s) from the ferromagnetic element sides 151, 152 and end portions 153, 154. The substrate 115 can be formed from a flexible plastic material, such that the MMR marker can be bent (such as when affixed to a flexible pipe). In another aspect, the substrate 115 can include one or more pedestals (here pedestals 117a and 117b are shown) that are provided to reduce the surface area contact with the vibrating ribbons. These pedestals 117a, 117b are designed in the housing at the approximate location of neutral nodes to support a ribbon, or a stack of ribbons, as the case may be.

In addition, as shown in FIG. 4, the housing can further include a cover 110 that is configured to enclose the aforementioned MMR components. The cover 110 and substrate 115 can be formed from a plastic or any other non-conductive material, such as PVC, or other polymers. In one aspect, the housing 105 can be formed using a conventional vacuum forming process. In a preferred aspect, the housing material can maintain its shape and spacing around the resonator strip(s) and bias material(s). In addition, the housing 105 can be formed as a non-rigid or flexible structure (e.g., it can be corrugated), either as a result of material composition or thickness of the housing walls. Also, the housing 105 can have a low profile. For example, a corrugated housing may provide higher strength than a flat housing and can flex, making the product suitable for direct bury applications and on plastic pipe applications. In another aspect, the housing can include thin, vertical ribs that can reduce the ribbon friction with the side walls of the housing, with the ribs preferably aligned with the nodes of each ribbon.

In an alternative aspect of the invention, the MMR markers described herein can be placed within a protective capsule or outer housing designed to withstand rugged conditions. The protective capsule can be formed from a rugged material such as high density polyethylene (HDPE).

Any of the MMR marker configurations described herein can be disposed on or near an underground asset, such as a pipe, conduit, or other facility. For example, an MMR marker, such as MMR marker 100 can be a stand-alone marker, it can be physically attached to an underground asset, such as a pipe or other utility, or it can be attached to another device, such as caution or warning tape, located at or near the underground asset. In addition, the MMR markers described herein can be utilized in non-underground environments, such as for use in locating and identifying above-ground assets otherwise hidden from view (such as in a container or within a building wall, ceiling, or floor).

Moreover, the MMR markers can be specifically designed to operate at different frequencies which are associated with unique asset types such as different utility infrastructure (e.g., water, waste water, electric, telephone/cable/data, and gas). For example, in one aspect, the MMR marker has a frequency range of from about 34 kHz to about 80 kHz. It is noted that for some applications, for example, for plastic pipe locating, frequency shifts are not desirable where multiple MMR markers may be combined to achieve additional detection depth. Accordingly, the MMR markers disclosed herein can have a longer length or be clustered for additional depth. In addition, especially for pipe locating applications, the MMR markers can be employed to provide not only asset location, but also asset directionality.

In another aspect of the invention, FIG. 2A shows MMR marker 200, which is configured as a device having a longer length and a plurality of resonator strips. MMR marker 200 includes a plurality ferromagnetic elements 250 (also referred to herein as resonator strips or ribbons). In this embodiment, the ferromagnetic elements comprise six resonator strips 250a-250f placed in a stacked arrangement directly over top of each other, without the need for any spacers or other separating structures. With five resonator strips, the device can provide increased signal and frequency stability. While five resonator strips are shown as comprising ferromagnetic element stack 250, the plurality of ferromagnetic elements may comprise a stack of 2, 3, 4, 5, 6, 7, 8, or more resonator strips, depending on the conditions.

In one aspect, each ferromagnetic element 250 has a substantially rectangular, strip form, with opposing lateral sides 251 and 252, a first lengthwise end 253 and a second lengthwise end 254. In alternative embodiments, the ferromagnetic elements can have another shape, such as a substantially oval shape.

In this aspect of the invention, resonator strips 250 each comprise a ferromagnetic material with magnetostrictive properties, such as a magnetic amorphous alloy or crystalline material such as those available from Vacuumschmelze GmbH of Hanau, Germany or Metglas, Inc. of Conway, S.C. The physical dimensions, such as the length (L), width (W), and thickness, of the resonator strips can be chosen based on a number of factors, including the desired response frequency. The ribbons may be annealed or non-annealed.

In this aspect of the invention, the resonator strips 250 each have a length that is an integer multiple of a half wavelength of a corresponding resonant frequency, specifically, the total length of the resonator strips is four ½ λr segments. As shown in FIG. 2A, resonator strip 250 has an overall length which corresponds to the length of each half-wavelength segment (here segments 255a, 255b, 255c, and 255d), with segment 255a having a length $l_1$, segment 255b having a length $l_2$, segment 255c having a length $l_3$, and segment 255d having a length $l_4$.

While the embodiment of FIG. 2A is described with respect to a resonator strip stack of length 2 L, where L is the length of two ½ λr segments in an alternative aspect, as would be understood by one of ordinary skill in the art given the present description, an MMR marker of having an overall length of 3 L or 4 L can also be utilized.

As with the embodiments described previously, it is advantageous to bias the resonator strips to an H field that produces the highest level for magneto-mechanical energy transfer and storage. Therefore, for increasing the detection range to a MMR operating at a desired frequency Fr, it is advantageous to affect the biasing of the resonator strips, which would allow for a longer ribbon length. In this aspect, this effect can be achieved by alternating the direction of the bias field H along the length of the ribbon at substantially every ½ λr wavelength.

In this aspect, as is shown in FIG. 2A, a first bias magnetic element 240a is disposed along side edge 251 and a second bias magnetic element 240b is disposed along side edge 252 at an opposite position, with each of bias magnetic elements 240a, 240b being equidistant from first end portion 253. In addition, a third bias magnetic element 240c is disposed along side edge 251 and a second bias magnetic element 240d is disposed along side edge 252 at an opposite position, with each of bias magnetic elements 240c, 240d being positioned closer to and equidistant from second end portion 254. In this configuration, the bias magnetic elements have their respective north (N) poles facing each other. As such the H field lines from the magnetic elements align in the directions of arrows 248, 249 as shown in FIG. 2A, where segments 255a and 255c are biased in a direction 248 opposite to the direction 249 that segments 255b and 255d are biased. In this manner, each alternating ½ λr segment is biased in an opposite longitudinal direction. When all the sections are biased equally and are equal in length, matching frequencies of all the vibrating sections, and thus maximum coherence and energy storage, can be achieved.

The bias magnetic elements 240a-240d can comprise the same materials described above with respect to FIG. 1A.

In another aspect, FIG. 2B shows another extended length MMR marker 200'. MMR marker 200' comprises a single ferromagnetic element 250 (also referred to herein as resonator strip or ribbon), with a modified bias magnet configuration. As would be understood, in alternative aspects, a plurality of ferromagnetic elements can also be utilized with this bias magnet configuration In the embodiment of FIG. 2B, the ferromagnetic element 250 comprises a substantially rectangular, strip form, with opposing lateral sides 251 and 252, a first lengthwise end 253 and a second lengthwise end 254. In alternative embodiments, the ferromagnetic element can have another shape, such as a substantially oval shape.

In this aspect of the invention, resonator strip 250 comprises a ferromagnetic material with magnetostrictive properties, such as those described above. The resonator strip 250 has a length that is an integer multiple of a half wavelength of a corresponding resonant frequency, specifically, the total length of the resonator strips is four ½ λr segments.

In this aspect, as is shown in FIG. 2B, a first bias magnetic element 240a is disposed along side edge 251 at a distance corresponding to a ½ λr from the first end portion 253. A second bias magnetic element 240b is disposed along side edge at a position equidistant from both first end portion 253 and second end portion 254. In addition, a third bias magnetic element 240c is disposed along side edge 251 and is positioned at a distance corresponding to a half wavelength from the second end portion 254. In this configuration, the bias magnetic elements 240a and 240c have their respective north (N) poles facing the resonator strip 250 and bias magnetic element 240b has its south (S) pole facing the resonator strip 250. As such the H field lines from the magnetic elements align in the directions of arrows 248, 249 as shown in FIG. 2B, where segments 255a and 255c are biased in a direction 248 opposite to the direction 249 that segments 255b and 255d are biased. In this manner, each alternating ½ λr segment is biased in an opposite longitudinal direction. When all the sections are biased equally and are equal in length, matching frequencies of all the vibrating sections, and thus maximum coherence and energy storage, can be achieved.

The bias magnetic elements 240a-240c can comprise the same materials as described above.

Figure 3A:
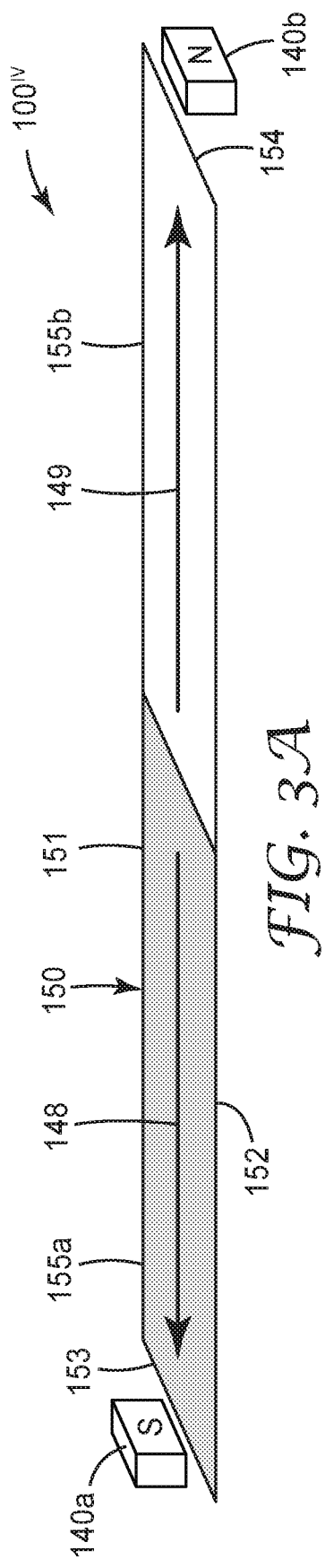
FIG. 3A is an isometric view of components of a magneto mechanical marker according to another aspect of the invention.

In an alternative aspect of the invention, an MMR marker can utilize end biasing in addition to or instead of biasing along a side edge. For example, in another aspect, FIG. 3A shows an MMR marker 100$^{iv}$. MMR marker 100$^{iv}$ includes a one or more ferromagnetic elements 150, in this embodiment, only a single resonator strip is shown. In one aspect, ferromagnetic element 150 has a substantially rectangular, strip form, with opposing lateral sides 151 and 152, a first lengthwise end 153 and a second lengthwise end 154. In alternative embodiments, the ferromagnetic element can have another shape, such as a substantially oval shape.

In this alternative aspect, as is shown in FIG. 3A, bias magnetic elements 140a and 140b are respectively positioned at first and second end portions 153, 154. In this configuration, the bias magnetic elements 140a and 140b have their south (S) poles each facing the resonator strip 150. As such, the H field lines from the magnetic elements align in the directions of arrows 148, 149 as shown in FIG. 3A, where segment 155a is biased in a direction 148 opposite to the direction 149 that segment 155b is biased. In this manner, each ½ λr segment is biased in an opposite longitudinal direction. In this aspect, end biasing can be employed for a resonator strip having a total length of one wavelength.

Because the bias magnetic elements have their S poles facing each other, the MMR device can further include one or more restraining elements configured to keep the ribbon(s) away from both end positioned magnetic elements. For example, the resonator strip(s) 150 can further include at least one hole formed at a neutral node position along the length of the resonator strip. In this alternative aspect, the device housing can further include at least one fixed pin to be inserted in the hole(s) that will prevent displacement of the resonator strip(s).

Other aspects of MMR marker 100" can be the same as those described with respect to FIG. 1A.

Figure 3B:
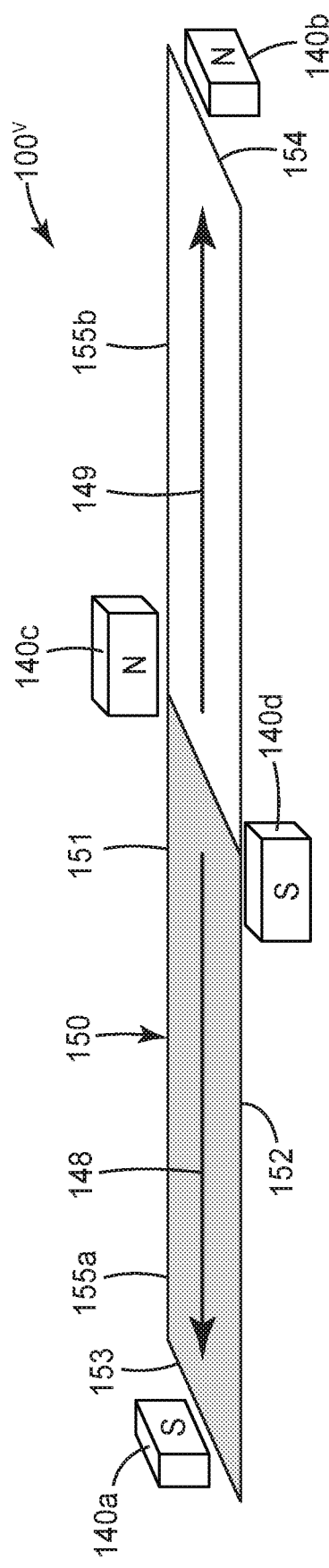
FIG. 3B is an isometric view of components of a magneto mechanical marker according to another aspect of the invention.

In yet another aspect, FIG. 3B shows an MMR marker 100'". MMR marker 100$^v$ includes a one or more ferromagnetic elements 150, in this embodiment, only a single resonator strip is shown. In one aspect, ferromagnetic element 150 has a substantially rectangular, strip form, with opposing lateral sides 151 and 152, a first lengthwise end 153 and a second lengthwise end 154. In alternative embodiments, the ferromagnetic element can have another shape, such as a substantially oval shape.

In this alternative aspect, as is shown in FIG. 3B, bias magnetic elements 140a and 140b are respectively positioned at first and second end portions 153, 154, while bias magnetic elements 140c is disposed along side edge 151 at a position equidistant from first and second end portions 153, 154 and bias magnetic element 140d is disposed along side edge 152 at an opposite position to bias magnetic element 140c, also equidistant from first and second end portions 153, 154. In this configuration, the bias magnetic elements 140a and 140b have their south (S) poles each facing the resonator strip 150 and bias magnetic elements 140c and 140d have their respective north (N) poles facing each other. As such, the H field lines from the magnetic elements align in the directions of arrows 148, 149 as shown in FIG. 3B, where segment 155a is biased in a direction 148 opposite to the direction 149 that segment 155b is biased. In this manner, each ½ λr segment is biased in an opposite longitudinal direction. In this aspect, end biasing can be employed for a resonator strip having a total length of one wavelength.

As with the embodiment described above with respect to FIG. 3A, the MMR device can further include one or more restraining elements configured to keep the ribbon(s) away from both end positioned magnetic elements.

Other aspects of MMR marker 100$^v$ can be the same as those described with respect to FIGS. 1A and 3A.

As described above, the MMR markers can be specifically designed to operate at different frequencies which are associated with unique asset types such as different utility infrastructure (e.g., water, waste water, electric, telephone/cable/data, and gas).

A portable locating device can be used to detect the MMR markers described herein. An exemplary portable locating device is described in US 2012/068823, incorporated by reference herein in its entirety. Such a locating device can comprise a single antenna that is used to generate an electromagnetic field and to detect a response of the MMR marker 100 (or the others). In an alternative aspect, the portable locating device can comprise multiple antennas, where one antenna could be used for generating an electromagnetic field and a second antenna could be used for detecting the response of the MMR marker to the generated field. The locating device can be battery powered for better portability. An integrated display can provide a user with a variety of information about located MMR markers and the assets that the MMR markers are associated with. For example, the display can provide information about marker and asset depth, direction, or other information about the MMR markers. Exemplary portable locating devices include the 3M™ Dynatel™ 1420 Locator and the 3M™ Dynatel™ 7420 Locator, both distributed by 3M Company of St. Paul, Minn. In one embodiment, the locating device firmware can be programmed so as to tune the locator antenna to radiate a particular, or several particular desired frequencies.

In alternative aspects, the MMR markers described herein can be utilized as part of a sterilization indicator system that provides time, temperature, and/or chemical information. In a further alternative aspect, the MMR markers described herein can be utilized as part of a perishable (e.g., food spoilage) indicator system that provides time and temperature information. In a further alternative aspect, the MMR markers described herein can be utilized as part of a leak detection system that provides leak information for above or below ground utilities. Alternatively, the MMR markers described herein can be designed to be physically affected by changing conditions so that a signal response may vary over time or conditions, indicating certain information to the user.

Experiments

Experiments were conducted comparing various characteristics of MMR markers designed in accordance with one or more of the configurations discussed above with MMR markers having a conventional bottom bias magnet design, such as is described in US 2012/068823.

Unless otherwise indicated, the resonator materials were selected to operate at about 55 kHz. Resonator materials used for the experimental samples were supplied by Vacuumschmelze GmbH of Hanau, Germany (11.9 mm Flat VC4613 M13, annealed). Resonator strip dimensions are indicated with respect to each respective experiment.

The MMR markers are excited with a burst of 220 cycles at the resonant frequency with a repetition rate of approximately 30 Hz (or 33 ms period). The excitation and detection is accomplished using a Helmholtz coil (shown below) with a radius of approximately 12" (or 0.305 m) and 30 turns in each sub-coil. The Helmholtz set up is also used to subject the tested samples to a DC magnetic field equivalent to the earth's.

The B field equation in the center along the x-axis is as follows:

$$B = (5/4)^{3/2} \times (\mu_0 NI)/R$$

where B is density of magnetic field (Tesla);
$\mu_0$ is magnetic permeability (1.26×10−6 Tm/A);
N is number of turn of each sub-coil (Turn);
I is current through each coil (A);
R is coil radius and distance between coils (m).

The Helmholtz coil arrangement maintains a substantially constant field around the center area and is suitable for the geometry of the test samples. The excitation is accomplished using an AC current source that can be configured to generate 220 cycle burst at a specific frequency with an adjustable repetition rate. An oscilloscope is used as a voltage acquisition instrument to collect data.

By repetitive capture with averaging and filtering, external noise can be supressed. The received signal is filtered and averaged to reduce noise influence then recorded in a relative scale, e.g., as dBs, in these experiments. This scale is relevant for buried electronic marker detection since it is used in commercially available detection devices. Logarithmic scales are used due to the large signal variance with distance from the detector, the return signal from a resonating marker device is proportional to the inverse sixth power of distance (inverse cubic each way, round trip becomes to the inverse sixth power). A signal equivalent to approximately 0.1 mOe AC or less is used to simulate the excitation field from a typical marker locator at a distance of 3'-4'.

As would be apparent to one of ordinary skill in the art given the present description, there are several alternative approaches to couple the AC and DC sources together as well as measure the received signals from the MMR markers at the Helmholtz coil.

For simulating the effect of the earth's magnetic field, it is important to measure the ambient magnetic field with a gaussmeter. It is important to position the Helmholz coil where there's little or no ambient DC field along the x-axis of the coil. If this is not possible, then the ambient DC field along the x-axis has to be added algebraically to the induced DC field, when simulating the earth's field.

Step 1: Test samples are placed along the x-axis for maximum coupling to the Helmholz coil and for accurate simulation of the earth's magnetic field.

Step 2: A fixed magnitude AC signal current is swept in frequency while sampling the return signal from the MMR marker. The return signal at each frequency is measured and recorded. The absolute frequency and relative magnitude of the largest return signal are recorded, referred to as Frequency (Hz) and Gain (dB).

Step 3: A DC signal current is set to a current to simulate a specific magnitude of the earth's magnetic field between −1.5 to +1.5 Oe.

Step 4: Repeat Steps 2 & 3 with 0.3Oe steps.

Experiment 1

Figure 5A:
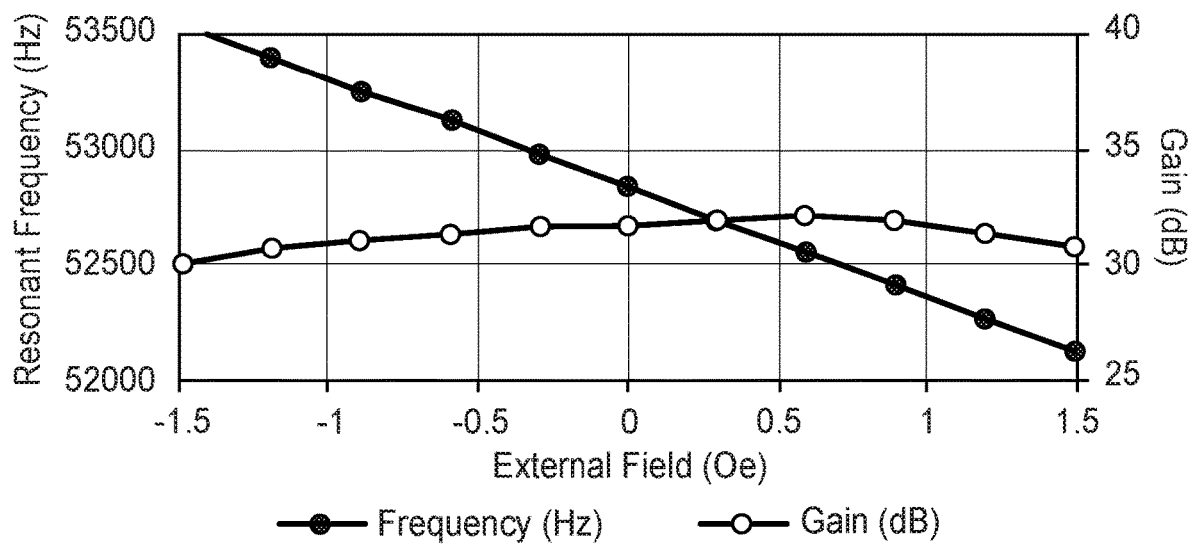
FIGS. 5A and 5B show the gain and frequency stability of a MMR device having a conventional design (FIG. 5A) and that of a differentially biased MMR device (FIG. 5B).
Figure 5B:
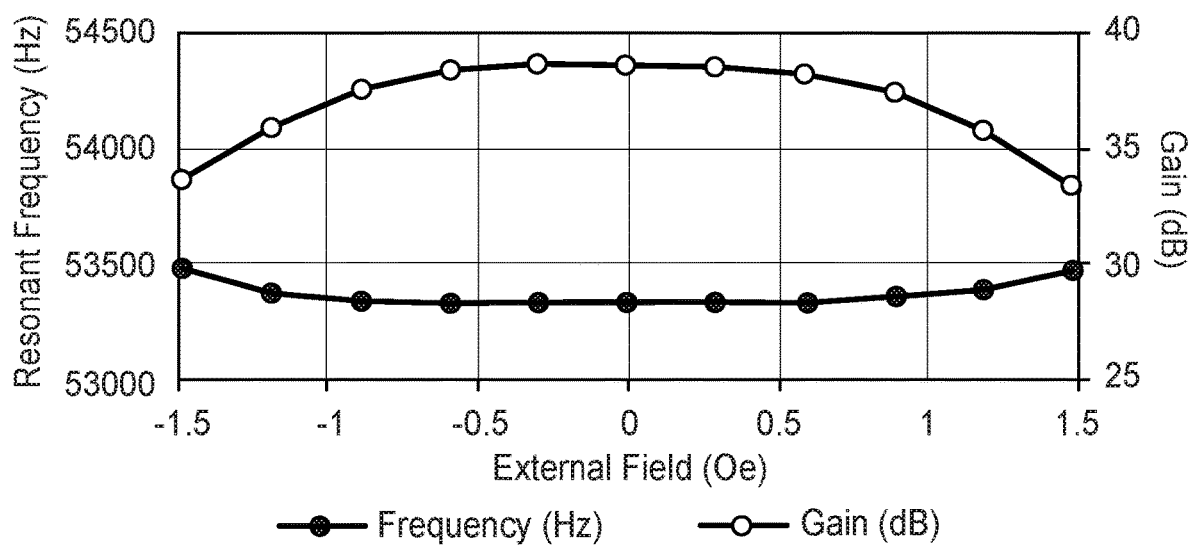

FIGS. 5A and 5B show a comparison (resonant frequency (Hz) vs. magnetic field offset (Oe)) of an experimental MMR device having differential biasing (MMR Sample 1—FIG. 5B) with conventional bottom bias MMR device (FIG. 5A). MMR Sample 1 comprises a single resonator strip having a configuration similar to that of MMR marker 100 described above with respect to FIG. 1A. The resonator strip had the following dimensions—about 80 mm (L)×11.9 mm (W). The side edge bias magnets were KJ Magnetics Nd N42SH super magnets in block shape (T 1/16", H 1/8", W 1/4") with magnetization through the thickness. The side magnet spacing is adjusted to maximize the return from the MMR device which, as in FIG. 1.A, comprised one ribbon that is a whole wavelength of the resonant frequency (i.e., two ½ wavelengths with opposite bias direction).

In comparison, the conventional design included a stack of a bias magnet strip, a plastic spacer and two identical 40 mm long ribbons. The ribbons each had a length of ½ wavelength of the resonant frequency. Both MMR devices are tuned at a frequency in the 55 kHz range by virtue of their resonance wavelength, which is same at approximately 40 mm length. The maximum gain, or return signal from a MMR device is a function of the bias field coupled to the ribbon predominantly along the longitudinal axis. The spacer is adjusted to maximize the return signal.

FIG. 5B shows that MMR Sample 1 has a significantly higher frequency stability and higher gain as compared to the conventional MMR device. With the same amount of resonator ribbon material used in both, MMR Sample 1 showed over +6 dB gain increase which is equivalent to over 4× in power, compared to the conventional configuration, and near 10× reduction in MMR resonant frequency shift over the +/−0.6 Oe earth's magnetic field range, eliminating the more than 1% frequency shift experienced by the conventional MMR resonator. The increase in frequency stability of the experimental design MMR Sample 1 gives increased detection efficiency of the detector-marker system and range. It also enables a wider usage of such a stable resonator device that exhibits high energy transfer efficiency to be used as a precision material sensor, with no internal power source required.

Experiment #2

Figure 6:
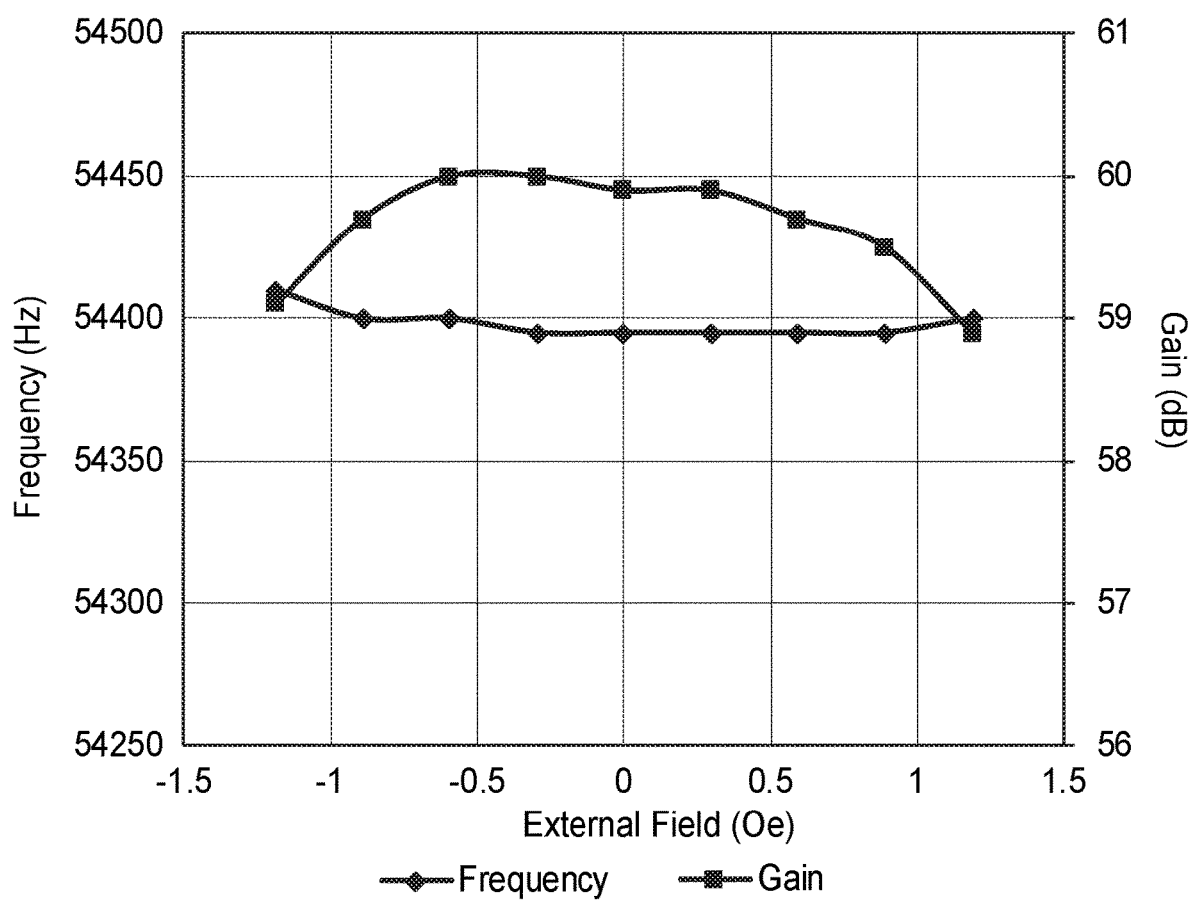
FIG. 6 shows the gain and frequency stability of another differentially biased MMR device.

FIG. 6 shows the gain and frequency stability (resonant frequency (Hz) vs. magnetic field offset (Oe)) of another experimental MMR device with differential biasing (MMR Sample 2). MMR Sample 2 comprises a resonator having a stack of five resonator strips (similar to that shown in FIG. 2A), with a length of 3 L (3 full wavelengths @55 khz). Each resonator strip had the following dimensions: 240 mm (L)×11.9 mm (W). The bias magnets were arranged as side bias magnets with 3 pairs of magnets, with the central magnets longitudinally spaced one full wavelength from the adjacent magnet pairs. The side edge bias magnets were the same as used in Experiment #1.

FIG. 6 shows that MMR Sample 2 has significantly higher net gain at about 28 dB increase over the conventional MMR resonator, with excellent frequency stability over a wider external DC field. Note that the Frequency vertical scale of FIG. 6 is 50 Hz/division which is ⅒th the Frequency vertical scale used in FIG. 5 which is 500 Hz per division. Also note that the Gain vertical scale of FIG. 6 is 1 dB/division (or 12% per division) compared to the Gain vertical scale of 5 dB/division (or 78% per division) used in FIG. 5. Higher gain in MMR resonators of the conventional configuration resulted in increased frequency shift under an external magnetic field. This is because of the non-differential biasing arrangement of the conventional configurations. In the experimental design, the use of differential pairs of whole wavelength long ribbon, i.e. an even number of ½ wavelengths in the same ribbon, provides a strong rejection of an external field. The extent of the rejection depends on the linearity of the B-H curve of the ribbon material. In other words, the change in the propagation velocity of the material, near the operating point, is linear with a change in the bias field and would shift equally for a positive or a negative change in bias. Hence, when a pair of ribbons are subjected to differential bias configuration (opposite along the longitudinal direction), one segment of the ribbon would experience a reduction in propagation velocity and the other half would experience an increase in the propagation velocity, resulting in a constant propagation velocity through the full wavelength ribbon. Even more suitable linearity results are obtained when the ribbons are biased in the substantially linear zone of the F vs B in a MMR resonator.

Thus, the MMR markers described herein can be utilized in many different identification and location applications. For example, an MMR marker can be a stand-alone marker, it can be physically attached to an underground asset, such as a pipe or other utility, or it can be attached to another device, such as caution or warning tape, located at or near the underground asset. Several resonator strip configurations can be used to identify assets buried at depths from 4' to 6' below the ground surface. The differential biasing configuration can also significantly reduce the negative impact of the earth's magnetic field on detected signal. In addition, the MMR markers described herein can be utilized in non-underground environments, such as for use in locating and identifying above-ground assets otherwise hidden from view (such as in a container or within a building wall, ceiling, or floor).

Further embodiments provide a device that can couple all resonances magnetically in phase and mechanically out of phase in a single long resonator strip. In addition, simple rectangular shapes can be used, eliminating the requirement for expensive ribbon cutting equipment.

Clusters of stacks of one wavelength or higher order can be used for surfaces that can flex or bend while a long multi-wavelength ribbon would be more suitable for flat surfaces. The advantage of these bendable resonators is that they are not damaged when bent and would work normally in the flat positions.

When applied to cylindrical surfaces such as plastic pipes, it is advantageous to tilt the bias magnets and displace them in order to reduce the profile of the MMR resonator on a curved surface. As long as the ribbons are biased at the high gain bias point, the resonator will function in the same manner as if the magnets are in the same plane as the ribbons.

The bias field in each ½ wavelength segment does not have to be uniform for these resonator configurations to work, however it is advantageous to use bias magnets and position them to obtain a substantially uniform bias field. This uniformity will lead to an even higher signal and could be optimized for each target application to lower cost or increase performance.

The present invention has now been described with reference to several individual embodiments. The foregoing detailed description has been given for clarity of understanding only. No unnecessary limitations are to be understood or taken from it. It will be apparent to those persons skilled in the art that many changes can be made in the embodiments described without departing from the scope of the invention. Thus, the scope of the present invention should not be limited to the details and structures described herein, but rather by the structures described by the language of the claims, and the equivalents of those structures.

The invention claimed is:

1. A magneto mechanical resonator device, comprising:
a ferromagnetic resonator element having a plurality (N) of ½ wavelength segments, wherein each ½ wavelength segment has a length corresponding to a length of a ½ wavelength of the resonant frequency of the ferromagnetic resonator element, the ferromagnetic resonator element formed from an amorphous metal material, and wherein N is at least 2; and
at least one bias magnetic element disposed along a lateral side of the ferromagnetic resonator element, wherein the at least one bias magnet has a first magnetic pole and a second opposite magnetic pole, wherein the first magnetic pole faces the lateral side of the ferromagnetic resonator element and the second magnetic pole faces opposite from the lateral side of the ferromagnetic resonator element, wherein each adjacent ½ wavelength segment is biased in an opposite direction.

2. The magneto mechanical resonator device of claim 1, further comprising a plurality of ferromagnetic elements disposed in a stacked arrangement.

3. The magneto mechanical resonator device of claim 1, further comprising a housing to enclose the resonator device.

4. The magneto mechanical resonator device of claim 1, further comprising a plurality of ferromagnetic elements having a stacked arrangement.

5. The magneto mechanical resonator device of claim 1, further comprising a housing to enclose the ferromagnetic resonator element and at least on bias magnetic element.

6. The magneto mechanical resonator device of claim 1, wherein the resonator device is detectable at a depth up to about 60 inches underground.

7. The magneto mechanical resonator device of claim 5, wherein the housing comprises a substrate to support the ferromagnetic resonator element and cover to enclose the ferromagnetic resonator element and the at least one bias magnet, wherein at least one of the substrate and housing comprises one or more slots located along each side of the ferromagnetic resonator element that are positioned at end and/or central locations along the length of the ferromagnetic resonator element.

8. The magneto mechanical resonator device of claim 1, comprising a first bias magnetic element disposed at a first side edge location of the ferromagnetic resonator element and a second bias magnetic element disposed a second side edge location of the ferromagnetic resonator element, wherein the first side location is opposite the second side location.

9. The magneto mechanical resonator device of claim 8, wherein the first bias magnetic element is disposed at the first side edge location of the ferromagnetic resonator element at a position equidistant from first and second end portions of the ferromagnetic resonator element and the second bias magnetic element is disposed at the second side edge location of the ferromagnetic resonator element at a position equidistant from first and second end portions of the ferromagnetic resonator element, wherein the first and second bias magnetic elements have the same respective magnetic poles facing each other such that each ½ wavelength segment is biased in an opposite longitudinal direction.

10. The magneto mechanical resonator device of claim 1, wherein the at least one bias magnetic element comprises a single bias magnetic element disposed along a lateral side edge at a position equidistant from first and second end portions of the ferromagnetic resonator element, wherein each ½ wavelength segment is biased in an opposite longitudinal direction.

11. The magneto mechanical resonator device of claim 1, comprising:
first and second bias magnetic elements disposed opposite one another along opposing lateral side edges of the ferromagnetic resonator element at a first end portion of the ferromagnetic resonator element; and
third and fourth bias magnetic elements disposed opposite one another along the opposing lateral side edges of the ferromagnetic resonator element at a second end portion of the ferromagnetic resonator element, wherein the first, second, third, and fourth bias magnetic elements have the same magnetic poles facing the ferromagnetic resonator element such that each ½ wavelength segment is biased in an opposite longitudinal direction.

12. The magneto mechanical resonator device of claim 1, comprising:
first and second bias magnetic elements disposed opposite one another along opposing side edges at a first end portion of the ferromagnetic resonator element;
third and fourth bias magnetic elements disposed opposite one another along opposing side edges at a central longitudinal position along the length of the ferromagnetic resonator element being located equidistant from the first end portion and a second end portion of the ferromagnetic resonator element;
fifth and sixth bias magnetic elements disposed opposite one another along opposing side edges at the second end portion of the ferromagnetic resonator element, wherein the first, second, fifth and sixth bias magnetic elements have the same first magnetic pole facing the ferromagnetic resonator element and the third and fourth bias magnetic elements the same second magnetic pole facing the ferromagnetic resonator element such that each ½ wavelength segment is biased in an opposite longitudinal direction.

13. The magneto mechanical resonator device of claim 7, wherein the first side location corresponds to a beginning of a ½ wavelength segment of the ferromagnetic resonator element.

14. The magneto mechanical resonator device of claim 1, wherein a length of the ferromagnetic resonator element is substantially equal to at least 2 full wavelengths of a resonant frequency of the ferromagnetic resonator element.

15. The magneto mechanical resonator device of claim 1, wherein N equals an even number of 2 or more.

16. A magneto mechanical marker system comprising the magneto mechanical resonator device of claim 1 and a portable locating device.

17. A magneto mechanical resonator device comprising:
an amorphous metal ribbon having a length that is an integer multiple (N) of a ½ wavelength of a corresponding resonant frequency, the ribbon being subjected to a differential alternating biasing, wherein the ribbon includes a plurality of ½ wavelength segments, and
at least one bias magnet having a first magnetic pole and a second opposite magnetic pole, wherein the first magnetic pole faces a lateral side of the ribbon and the second magnetic pole faces opposite from the lateral side of the ribbon, wherein each adjacent ½ wavelength segment is biased in an opposite direction.

18. The magneto mechanical resonator device of claim 17, wherein the differential alternating biasing comprises at least one bias magnetic element disposed along a lateral side of the ribbon.

* * * * *

UNITED STATES PATENT AND TRADEMARK OFFICE
CERTIFICATE OF CORRECTION

PATENT NO. : 10,928,539 B2
APPLICATION NO. : 16/308992
DATED : February 23, 2021
INVENTOR(S) : Ziyad Doany It is certified that error appears in the above-identified patent and that said Letters Patent is hereby corrected as shown below:

In the Specification

Column 3,
Line 34, delete "Fr=[1/(2L)]*sqrt(EH/φ;" and insert -- Fr=[1/(2L)]*sqrt(EH/ρ); -- therefor.
Line 36, delete "p" and insert -- ρ -- therefor.

Column 6,
Line 22, delete "1/4" and insert -- 1/4" -- therefor.

Column 7,
Line 30, delete "Kr" and insert -- λr -- therefor.

Column 8,
Line 2, delete "marker 100. MMR marker 100''" and insert -- marker 100'''. MMR marker 100''' -- therefor.

Column 10,
Line 22, delete "kr" and insert -- λr -- therefor.
Line 31, delete "kr" and insert -- λr -- therefor.

Column 12,
Line 11, delete "100''" and insert -- 100$^{iv}$ -- therefor.
Line 14, delete "100''" and insert -- 100$^{v}$ -- therefor.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*